(12) United States Patent
Yamada et al.

(10) Patent No.: US 6,896,397 B2
(45) Date of Patent: May 24, 2005

(54) VEHICULAR MARKER LAMP

(75) Inventors: Kenji Yamada, Shizuoka (JP); Yasuo Teranishi, Shizuoka (JP)

(73) Assignee: Koito Maufacturing Co., Ltd., Tokyo (JP)

( * ) Notice: Subject to any disclaimer, the term of this patent is extended or adjusted under 35 U.S.C. 154(b) by 21 days.

(21) Appl. No.: 10/692,538

(22) Filed: Oct. 24, 2003

(65) Prior Publication Data

US 2004/0130904 A1 Jul. 8, 2004

(30) Foreign Application Priority Data

Oct. 24, 2002 (JP) ................................. P. 2002-309107

(51) Int. Cl.[7] .......................................... F21W 101/14
(52) U.S. Cl. ...................... 362/511; 362/31; 362/541; 362/544; 362/545
(58) Field of Search .......................... 362/31, 511, 540, 362/541, 543–545

(56) References Cited

U.S. PATENT DOCUMENTS

| | | | |
|---|---|---|---|
| 6,196,704 B1 * | 3/2001 | Gauch et al. | ............... 362/276 |
| 6,273,594 B1 | 8/2001 | Ikeda et al. | |
| 6,302,551 B1 * | 10/2001 | Matumoto | .................... 362/27 |
| 6,382,822 B1 | 5/2002 | Mackawa et al. | |
| 6,447,155 B2 * | 9/2002 | Kondo et al. | ............... 362/545 |
| 6,508,576 B2 * | 1/2003 | Emmelmann et al. | ...... 362/543 |
| 6,530,683 B1 * | 3/2003 | Ohkohdo et al. | ........... 362/511 |

* cited by examiner

Primary Examiner—Laura K. Tso
(74) Attorney, Agent, or Firm—Koda & Androlia

(57) ABSTRACT

A vehicular marker lamp such as a tail and stop lamp, including a translucent member extending substantially along a translucent cover which is red and transparent with first light-emitting diodes in the back and second light-emitting diodes near the side end of the cover. The translucent member has a direct light-emitting region that transmits light, which is incident to the translucent member from the first light-emitting diodes, toward the front, and indirect light-emitting regions that internally reflect light, which is incident to the translucent member from the second light-emitting diodes, so as to emit such light toward the front. The direct light-emitting region is a red transparent region, and the indirect light-emitting regions are colorless transparent regions, thus allowing the appearances of the direct and indirect light-emitting regions to be significantly different from each other when the lamp is lit.

12 Claims, 7 Drawing Sheets

VEHICULAR MARKER LAMP

BACKGROUND OF THE INVENTION

1. Field of the Invention

The present invention relates to a vehicular marker lamp that is be lit in red.

2. Prior Art

Generally, a vehicular marker lamp that is lit in red such as a tail and stop lamp and the like is equipped with a red and transparent translucent cover as disclosed in Japanese Patent Application Laid-Open (Kokai) No. 2000-195309. In the tail and stop lamp shown in Japanese Patent Application Laid-Open (Kokai) No. 2000-322905, a red and transparent translucent member is provided between a light source and a translucent cover.

However, in these conventional vehicular marker lamps, the entire translucent cover or the entire translucent member is formed by a red and transparent member. Accordingly, when the lamp is lit, it appears to illuminate in mere red, which is relatively monotonous. Thus, the problem is that there is no novelty involved in lighting in the prior art lamps.

SUMMARY OF THE INVENTION

In view of the foregoing circumstances, the object of the present invention is to provide a vehicular marker lamp that is lit in red and still provides a novel appearance particularly when it is lit.

The present invention accomplishes the above object by exercising ingenuity in the method of emitting light to a translucent member so as to create a direct light-emitting region and an indirect light-emitting region(s) in the translucent member and by allocating these regions either to a red transparent region or a colorless transparent region.

More specifically, the above object is accomplished by a unique structure of the present invention for a vehicular marker lamp which is lit in red and is comprised of a lamp chamber constructed from a lamp body and a translucent cover attached to a front end opening of the lamp body, a plurality of light sources provided in the lamp chamber, and a translucent member that is provided in the light chamber and extends substantially along the translucent cover; and in the present invention:

the plurality of light sources comprise a first light source disposed behind the translucent member and a second light source disposed in the vicinity of a side end portion of the translucent member, and the translucent member is comprised of:

a direct light-emitting region that transmits light, which is incident to the translucent member from the first light source, toward the front of the lamp, and an indirect light-emitting region that internally reflects light, which is incident to the translucent member from the second light source, so as to emit such light toward the front of the lamp, and one of the direct light-emitting region and the indirect light-emitting region is formed as a red transparent region and the other is formed as a colorless transparent region.

The "vehicular marker lamp" is not limited to a specific kind of vehicular marker lamp as long as it is lit in red. For example, a tail lamp, a stop lamp, a tail and stop lamp, and a rear fog lamp and the like are the lamps in the sense of the present invention. If the case of tail and stop lamps, both the first light source and the second light source can be lit at the same time in both a tail lamp lighting mode and a stop lamp lighting mode. Alternatively, one of the first light source and the second light source can be lit in the tail lamp lighting mode, and the other or both of the first light source and the second light source can be lit in the stop lamp lighting mode; and further, reversed structures are alternatively possible.

The translucent cover cannot only be red and transparent, and it can be colorless and transparent. Alternatively, the cover can be colored in a transparent color other than red as long as the vehicular marker lamp appears lit in red.

Each of the plurality of light sources may not only emit red light, and it can emit white light. In addition, the type of the light sources is not specifically limited. For example, a light-emitting diode, an incandescent bulb or the like can be employed.

The positions where the direct light-emitting region and the indirect light-emitting region are formed in the translucent member and the specific structures such as sizes and shapes thereof are not specifically limited.

As described above, the vehicular marker lamp of the present invention is lit in red and has a translucent member that extends substantially along the translucent cover. In addition to this structure, the first light source is disposed in the back of the translucent member, and the second light source is disposed in the vicinity of the side end portion of the translucent member. Further, the translucent member has the direct light-emitting region that transmits light, which is incident to the translucent member from the first light source, toward the front of the lamp; and the translucent member further has the indirect light-emitting region that internally reflects light, which is incident to the translucent member from the second light source, so as to emit such light toward the front of the lamp. Accordingly, when the lamp is lit, the direct light-emitting region and the indirect light-emitting region differs from each other in the mode of light emission.

Further, in the translucent member employed in the present invention, one of the direct light-emitting region and the indirect light-emitting region is formed as a red transparent region, and the other a colorless transparent region. Therefore, when the lamp is lit, the different intensities of the red color are provided between the direct light-emitting region and the indirect light-emitting region.

Accordingly, since there are differences in the manner of light emission and in the red color intensity, there is a significant difference in appearance of the direct light emitting region and indirect light emitting region.

Thus, according to the present invention, the vehicular marker lamp of the present invention that is lit in red has a novel appearance when it is lit.

Further, in the vehicular marker lamp of the present invention, there is a difference in red color intensity between the direct light-emitting region and the indirect light-emitting region. Accordingly, it is possible to provide a lamp design that has various intensities of red color, and it is also possible to provide lamp that has a novel appearance even when the lamp is not lit.

In the above-described structure, the light source that emits light to the red transparent region can be one that emits red light. With this arrangement, the red transparent region appears to illuminate in red with an enhanced red color intensity. In this case, if the light source that emits light to the colorless transparent region is formed by one that emits red light, then the intensity of the red color increases further even in the colorless transparent region. On the other hand, if such a light source emits white light, the difference in the red color intensity between the red transparent region and the colorless transparent region becomes significant, and the contrast between those two regions can provide an even more novel appearance when the lamp is lit.

In the above-described structure, a second translucent member which is red and transparent can be provided between the direct light-emitting region and the first light source with the direct light-emitting region being set as a red transparent region. With this arrangement, when the lamp is lit, the red transparent region appears to illuminate in red with an enhanced color intensity. In this case, the second translucent member can be formed as a part of the translucent member, and this structure makes the lamp simple in structure.

Further, in the present invention, the translucent member can be provided with a plurality of fins that extend substantially in parallel with each other substantially along the translucent cover. In this structure, the second light source is disposed for each one of the fins, and a plurality of reflective elements for emitting light, which is incident to the translucent member from the second light source, toward the front of the lamp are provided on the rear end surface of each one of the fins which is located in the indirect light-emitting region. With this structure, the indirect light-emitting region appears to illuminate in a striped manner. Thus, since the appearance of the direct light emitting region and the appearance of the indirect light emitting region are significantly different, the lamp has an enhanced attractive and novel appearance when it is lit. The specific structure of each of the reflective elements is not particularly limited. For instance, reflective elements with a groove-like structure, reflective elements with scattered holes or the like can be employed.

Furthermore, in the present invention, a light diffusion treatment can be applied on at least a part of the direct light-emitting region so as to diffusely transmit light from the first light source. With this arrangement, the portion on which the light diffusion treatment has been performed appears to illuminate evenly. The type of the light diffusion treatment is not particularly limited. It is possible to execute a light diffusion treatment by performing embossing, frost processing or the like, or creating a plurality of reflective elements or the like. In addition, the light diffusion treatment can be performed either on the front surface or the rear surface of the direct light-emitting region or both of such surfaces.

BRIEF DESCRIPTION OF THE DRAWINGS

FIGS. 5A through 5C are front elevational views of the tail and stop lamp in different modes, wherein FIG. 5A shows the manner of light emission in a tail lamp lighting mode, FIG. 5B shows how the lamp is lit in the stop lamp lighting mode, and FIG. 5C shows how the lamp is lit in the tail and stop lamp lighting mode;

DETAILED DESCRIPTION OF THE INVENTION

Hereafter, embodiments of the present invention will be described with reference to the accompanying drawings.

Figure 1:
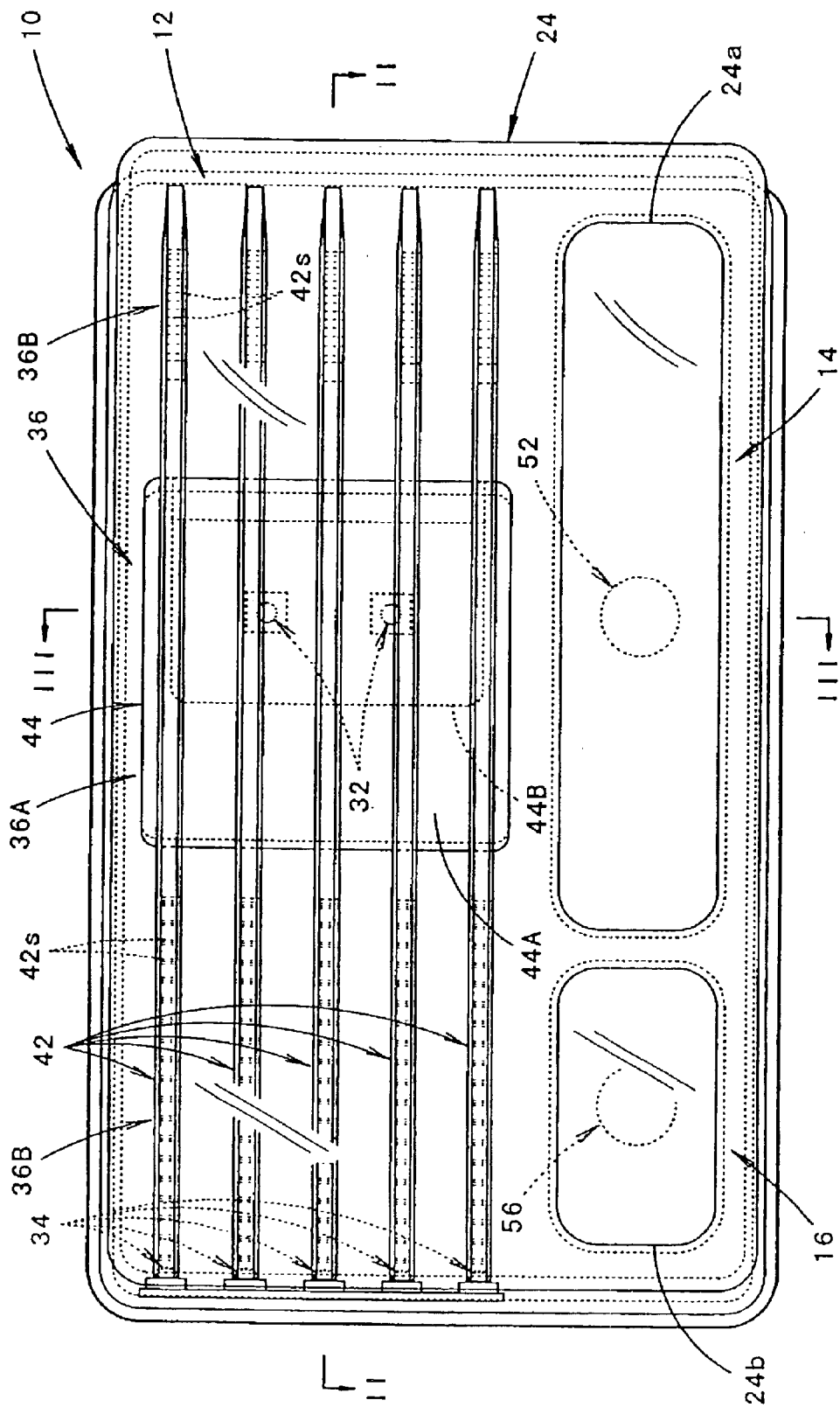
FIG. 1 is a front elevational view of the vehicular marker lamp according to one embodiment of the present invention.
Figure 2:
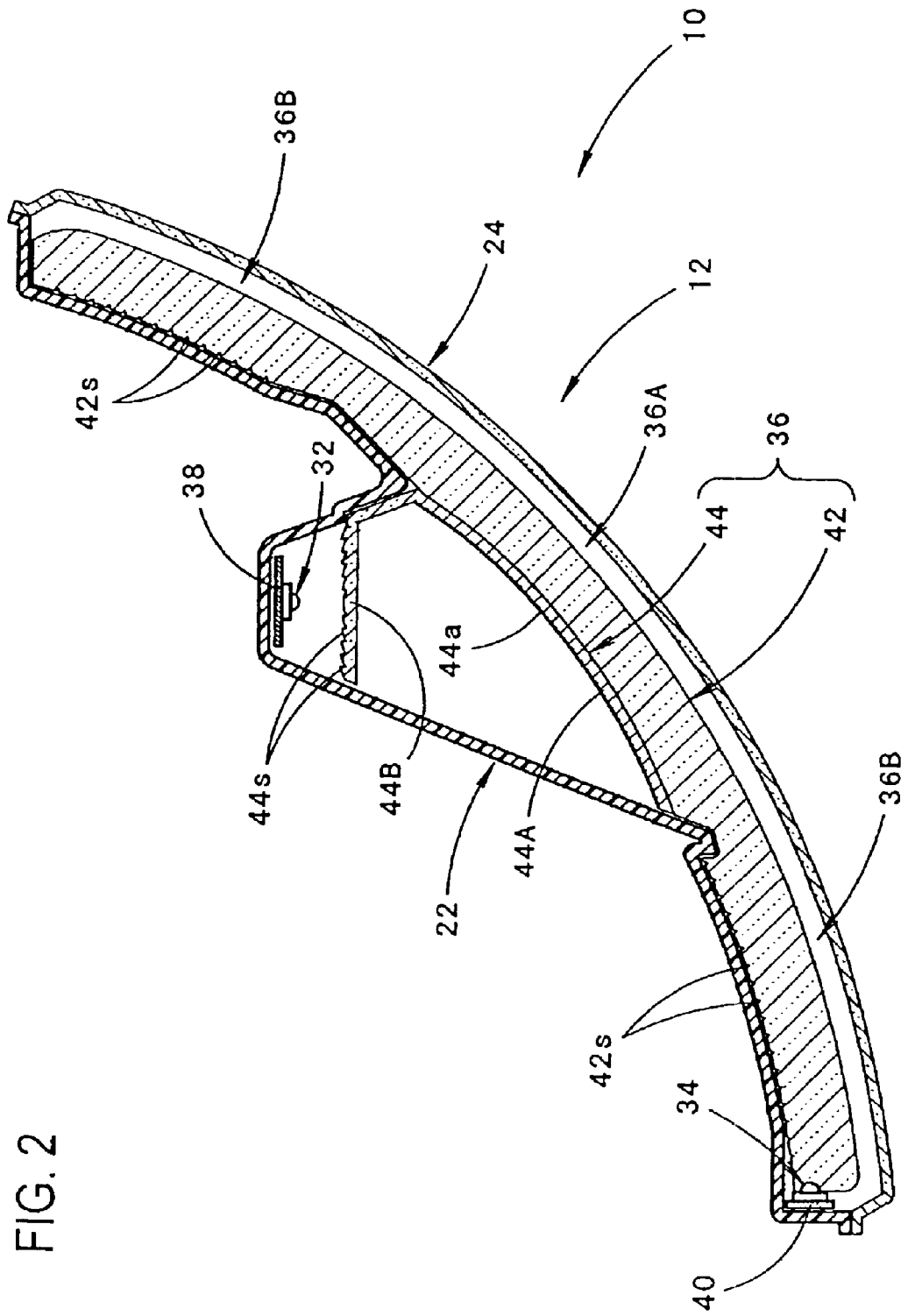
FIG. 2 is a sectional view taken along the line II—II in FIG. 1.
Figure 3:
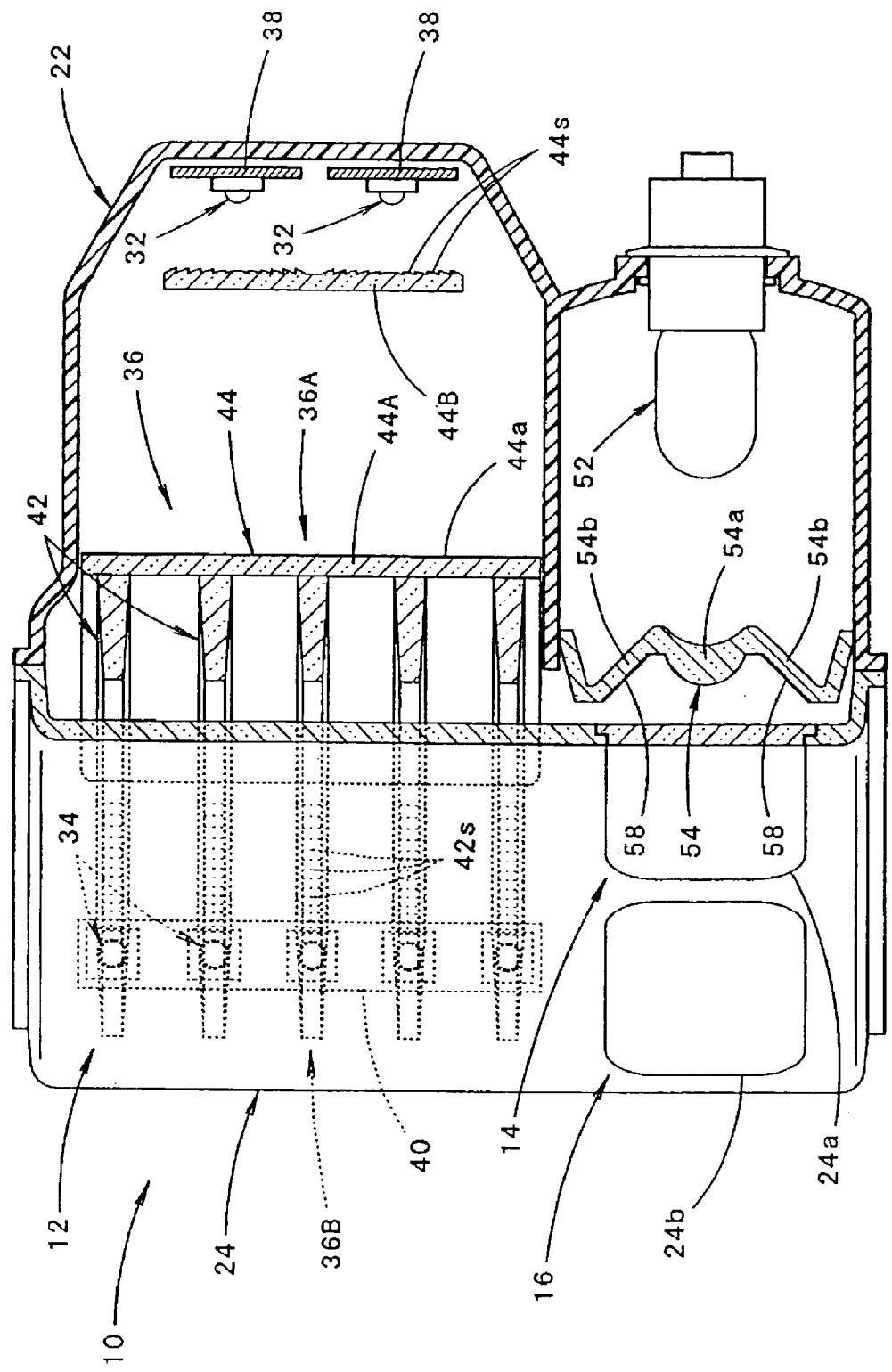
FIG. 3 is a sectional view taken along the line III—III in FIG. 1.

As shown in FIGS. 1 through 3, the vehicular marker lamp 10 of the shown embodiment of the present invention is a rear combination lamp mounted on the right rear end portion of a vehicle; and it includes a tail and stop lamp 12, a turn signal lamp 14, and a backup lamp 16. It should be noted that terms related to orientation, such as forward, rearward or the like, refers to orientation of the vehicular lamp 10, which is reverse to the orientation of the vehicle.

The vehicular lamp 10 has a substantially horizontally long rectangular profile when it is viewed, as seen from FIG. 1, from the front. As best seen from FIG. 2, a lamp body 22 and a translucent cover 24 attached to the front end opening of the lamp body 22 form a lamp chamber for the tail and stop lamp 12, a lamp chamber for the turn signal lamp 14, and a lamp chamber for the backup lamp 16 (see FIG. 3). The lamp chamber for the tail and stop lamp 12 is disposed on the upper stage, the lamp chamber for the turn signal lamp 14 is disposed on the outer side in the vehicle width direction on the lower stage, and the lamp chamber for the backup lamp 16 is disposed on the inner side in the vehicle width direction on the lower stage.

The translucent cover 24 is, as best seen from FIG. 2, curved so as to widely wrap around toward the rearward of the lamp from the inner side end portion in the vehicle width direction (left to right direction in FIG. 2) toward the outside end portion in the vehicle width direction. In regards to the translucent cover 24, the front region 24a of the lamp chamber for the turn signal lamp 14 and the front region 24b of the lamp chamber for the backup lamp 16 are colorless and transparent, while the region other than these is red and transparent.

The lamp chamber of the tail and stop lamp 12 accommodates, as best seen from FIGS. 1 and 3, two light-emitting diodes 32 that serve as a first light source, five light-emitting diodes 34 that serve as a second light source, and a translucent member 36 disposed so as to extend substantially along the translucent cover 24. The tail and stop lamp 12 is lit in red.

The two light-emitting diodes 32 are red light-emitting diodes, and both of which are lit in a stop-lamp lighting mode. The light-emitting diodes 32 are disposed in the back of (or behind) the translucent member 36 and face the front. These light-emitting diodes 32 are supported by the lamp body 22 via circuit boards 38.

The five light-emitting diodes 34 are red light-emitting diodes, and they are all lit in a tail-lamp lighting mode. The light-emitting diodes 34 are disposed in the vicinity of the inner side end portion (see FIG. 2) in the vehicle width direction of the translucent member 36 and face the translucent member 36. These light-emitting diodes 34 are supported by the lamp body 22 via a circuit board 40.

The translucent member 36 is formed as a two-color molding that includes five colorless transparent fins 42 which extend horizontally at substantially equal vertical intervals and a red and transparent panel 44 that is integrally formed with the fins 42.

Each fin 42 has, as best seen from FIG. 3, a trapezoidal cross sectional shape of which the vertical width decreases in the forward direction (toward left in FIG. 3). Each fin 42 is formed so as to widely wrap around toward the rearward side of the lamp from the inner side end portion in the vehicle width direction to the outside end portion in the vehicle width direction substantially along the translucent cover 24. Each of the five light-emitting diodes 34 is disposed in the vicinity of the inner side end portion in the vehicle width direction of each one of the fins 42.

The panel 44 is disposed so as to abut against the rear end surface of the fins 42 in an intermediate portion in the horizontal direction. Further, the two light-emitting diodes 32 are disposed at a predetermined gap in between in the vertical direction behind the panel 44 of the translucent member 36.

Figure 4:
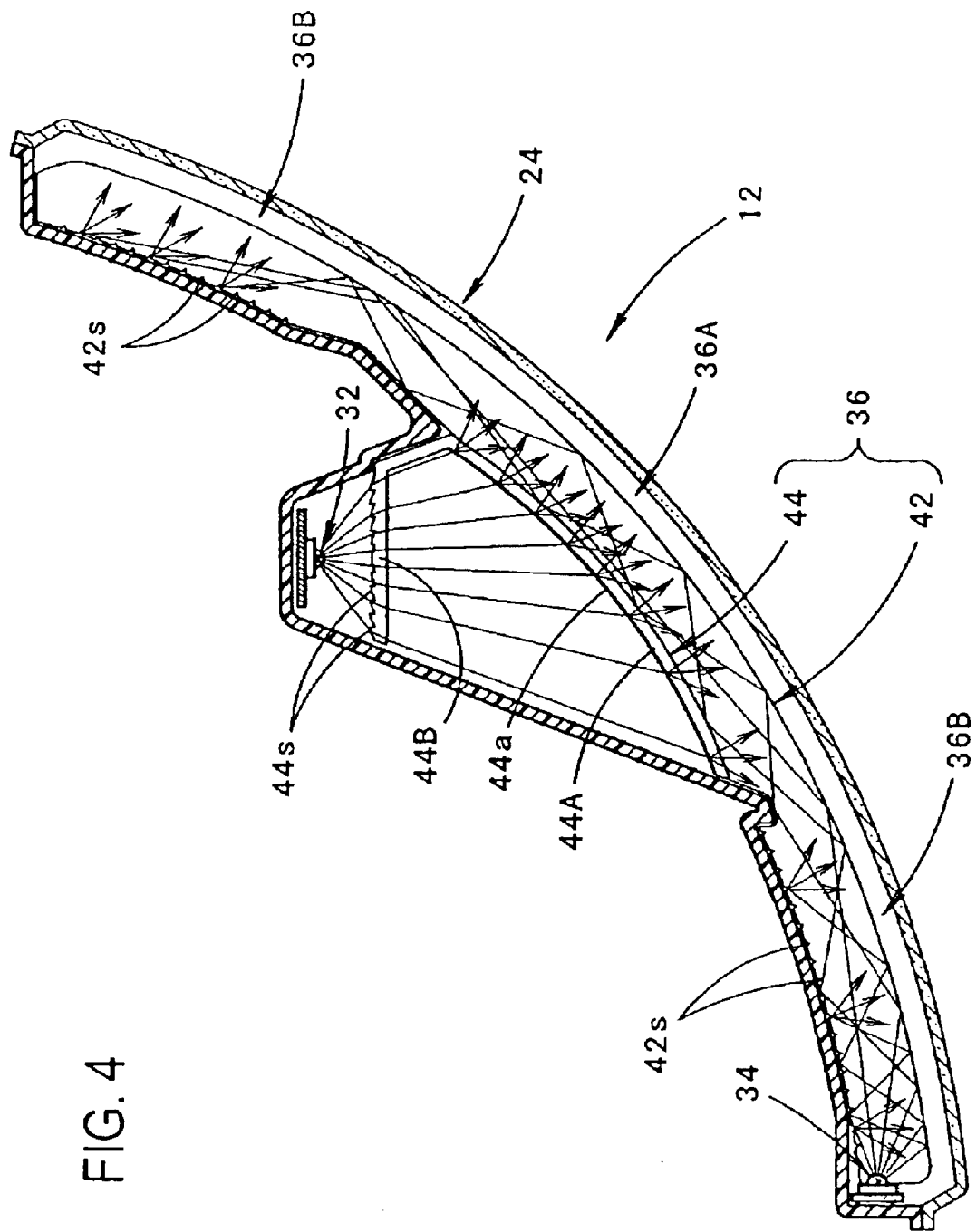
FIG. 4 shows, using FIG. 2, the light path of radiated light of the tail and stop lamp according to the vehicular marker lamp of the present invention.

With the structure describe above, as seen from FIG. 4, a portion of the translucent member 36 that has the panel 44 makes a direct light-emitting region 36A that transmits light which is incident to the translucent member 36 from the light-emitting diodes 32. Both side portions in the horizontal direction of the direct light-emitting region 36A are indirect light-emitting regions 36B that internally reflect light, which is incident to the translucent member 36 from the light-emitting diodes 34, so as to emit such light toward the front (downward in FIG. 4).

The direct light-emitting region 36A is a red transparent region formed by partially overlapping the red transparent panel 44 and five colorless transparent fins 42. The indirect light-emitting regions 36B are colorless transparent regions formed only by the colorless transparent fins 42.

The panel 44 is comprised of a panel main body 44A and a panel extended portion 44B. The panel extended portion 44B extends in a substantially L shape from the outside end portion to the rearward in the vehicle width direction of the panel main body 44A, and it serves as a second translucent member that extends in the lateral direction in front of the light-emitting diodes 32. A light diffusion treatment using embossing is performed on the entire rear surface of the panel main body 44A, thereby forming a light diffusion surface 44a. In addition, the rear surface of the panel extended portion 44B is formed with a plurality of lens elements 44s that carry out deflection control of divergent beams from the light-emitting diodes 32, so that such beams are incident to the panel main body 44A.

A plurality of reflective elements 42s for emitting light, which is incident to each fin 42 from the light-emitting diodes 34, toward the front are provided on the rear end surfaces of each fin 42, such rear end surfaces being in the indirect light-emitting regions 36B. Each reflective element 42s is in the form of a vertical groove that extends vertically, and such reflective elements 42s are formed at substantially equal intervals along a plane in the horizontal direction.

As shown in FIGS. 1 and 3, the lamp chamber of the turn signal lamp 14 accommodates an incandescent bulb 52 that emits amber light and a translucent member 54 that extends substantially along the translucent cover 24. Thus, the turn signal lamp 14 is lit in amber. On the other hand, the lamp chamber of the backup lamp 16 accommodates an incandescent bulb 56 that emits white light and a translucent member (which is not shown) disposed to extend substantially along the translucent cover 24. Thus, the backup lamp 16 is lit in white.

As best seen from FIG. 3, the vertically central portion 54a of the translucent member 54 is formed like a convex meniscus lens, and the upper and lower portions 54b are formed to have slopes that extend upward and downward, respectively, with an inclination angle of about 45° with respect to the front. Front surfaces of the upper and lower portions 54b are formed with reflective films 58 using aluminum vapor deposition treatment or the like.

Accordingly, when the turn signal lamp 14 is lit, the reflective films 58 reflect a stray light component which is of the light from the incandescent lamp 52 that passes through the vertically central portion 54a and advances forward, toward the front. As a result, the light emitting region of the turn signal lamp 14 appears larger in the vertical direction. On the other hand, when the turn signal lamp 14 is not lit, the lamp 14 appears smaller in its vertical direction.

Figure 5:
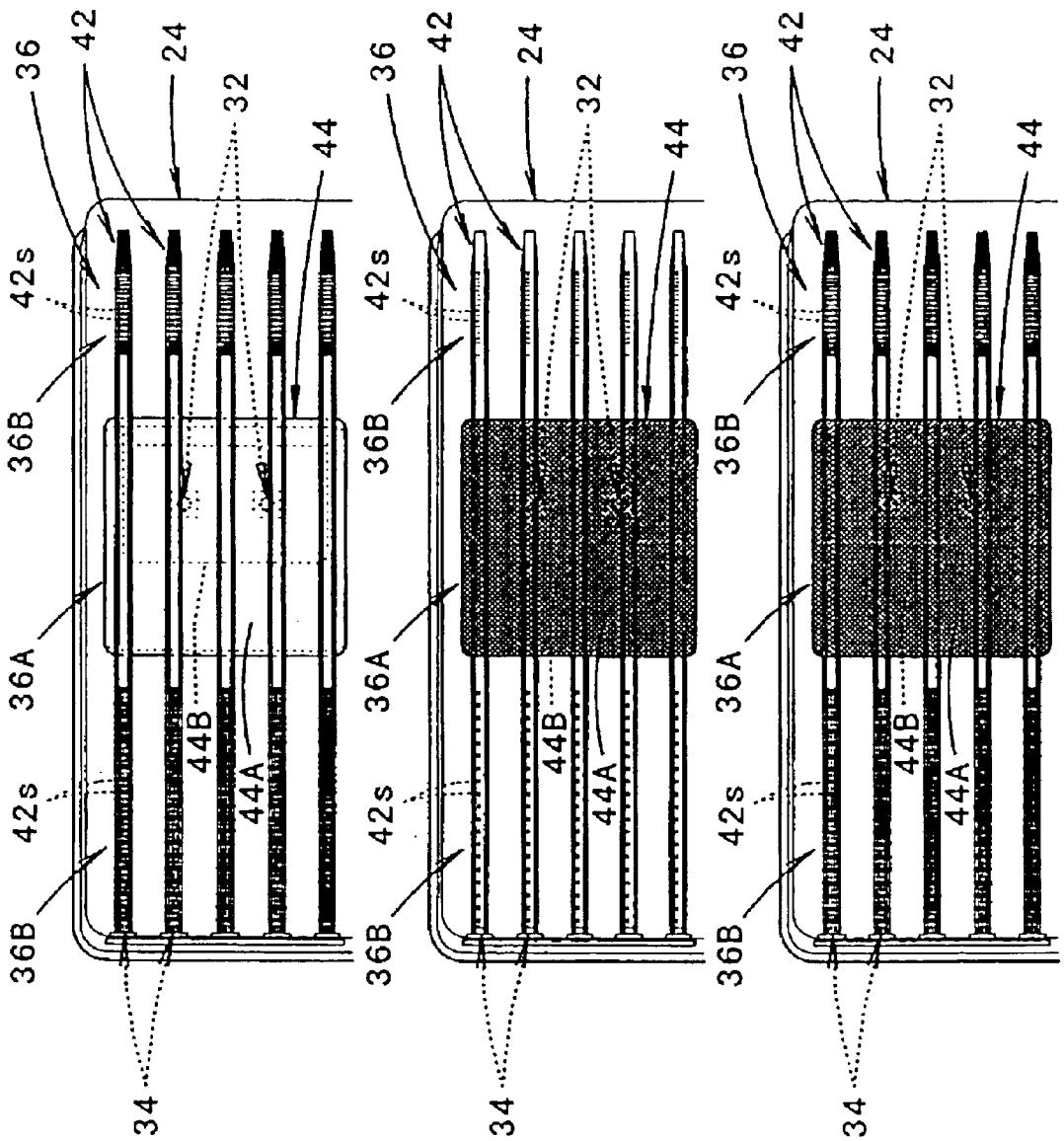

FIGS. 5A through 5C show how the tail and stop lamp 12 appears in different lighting modes.

As described above, five light-emitting diodes 34 are lit in the tail lamp lighting mode shown in FIG. 5A. Light incident to each fin 42 from each light-emitting diode 34 travels toward the outside end portion (toward right side in FIG. 4) in the vehicle width direction while being repeatedly reflected in its entirety by the surfaces of the fin 42 that serves as a light conductor. During this process, light incident to the reflective elements 42s located in the indirect light-emitting regions 36B is reflected by the reflective elements 42s toward the front of the lamp and emitted to the front from the front end surfaces of the fins 42. As a result, in the tail lamp lighting mode shown FIG. 5A, five fins 42 appear to illuminate as lateral stripes at substantially equal intervals in the vertical direction. While each fin 42 is colorless and transparent, each light-emitting diode 34 emits red light and the translucent cover 24 is red and transparent. Therefore, the lamp 12 appears red with some degrees of color intensity.

In the stop lamp lighting mode shown in FIG. 5B, two light-emitting diodes 32 are both lit. Light, which is emitted from each light-emitting diode 32 and reaches the light diffusion surface 44a of the panel main body 44A through the panel extended portion 44B, is diffusely transmitted by the panel main body 44A and emitted toward the front. Accordingly, the entire panel main body 44A in the direct light-emitting region 36A appears to illuminate substantially evenly. In the stop lamp lighting mode, all the light-emitting diodes 34 are lit in red, and since all the panel extended portion 44B, the panel main body 44A, and the translucent cover 24 are red and transparent, the lamp 12 is lit in red with a very enhanced color intensity.

In the tail and stop lamp lighting mode shown in FIG. 5C, five light-emitting diodes 34 and two light-emitting diodes 32 are all lit at the same time. Accordingly, five fins 42 appear to illuminate in a laterally striped manner at substantially equal intervals in the vertical direction, and the entire panel main body 44A appears to illuminate substantially evenly in the direct light-emitting region 36A.

As described above in detail, the tail and stop lamp 12 of the vehicular marker lamp 10 of the shown embodiment is lit in red and includes the translucent member 36 that extends substantially along the red transparent translucent cover 24; and two light-emitting diodes 32 are disposed in the back of the translucent member 36, and five light-emitting diodes 34 are disposed in the vicinity of the side end portion thereof. Furthermore, the translucent member 36 includes the direct light-emitting region 36A, which transmits light from the light-emitting diodes 32 toward the front, and the indirect light-emitting region 36B, which emits light from the light-emitting diodes 34 toward the front by internal reflections. Accordingly, when the lamp is lit, the manner of light emission differs in the direct light-emitting region 36A and the indirect light-emitting regions 36B.

Since the direct light-emitting region 36A of the translucent member 36 is a red transparent region, and the indirect light-emitting regions 36B are colorless transparent regions, when the lamp is lit, the direct light-emitting region 36A and the indirect light-emitting regions 36B have significant differences in intensity of red color.

Since there are differences in the manner of light emission and in the red color intensity, the appearance of the direct light emitting region 36A and the appearance of the indirect light emitting regions 36B are significantly different. Accordingly, the lamp when it is lit has an enhanced novel appearance. In addition, because of the differences in the red color intensity between the direct light-emitting region 36A and the indirect light-emitting regions 36B, the lamp has various intensities of red, and the lamp has a novel appearance even when it is not lit.

In the shown embodiment, two diodes 32 that emit light to the direct light-emitting region 36A are lit in red. Thus, the direct light-emitting region 36A appears to illuminate in red with an enhanced color intensity when the lamp is lit. Furthermore, in the embodiment, five light-emitting diodes 34 that emit light to the colorless transparent regions 36B are also lit in red; accordingly, the red color intensity is high even in the colorless transparent regions 36B.

Furthermore, in the shown embodiment, the panel extended portion 44B that is red and transparent is provided between the panel main body 44A, which is the direct light-emitting region 36A, and two light-emitting diodes 32. Therefore, the direct light-emitting region 36A appears to illuminate in red with an enhanced color density. In addition, since the panel extended portion 44B is a part of the translucent member 36, the lamp is simple in structure.

In the show embodiment, the translucent member 36 includes a plurality of fins 42 that extend substantially in parallel with each other substantially along the translucent cover 24, and the light-emitting diode 34 is disposed on each one of the fins 42. Furthermore, the plurality of reflective elements 42s for emitting light from the plurality of light-emitting diodes 34 toward the front are formed on the rear end surfaces of each fin 42, such surfaces being located in the indirect light-emitting regions 36B. Accordingly, when the lamp is lit, the indirect light-emitting regions 36B appear to illuminate in a lateral stripe fashion. Accordingly, since there is a significant difference in appearance between the direct light emitting region 36A and the indirect light emitting regions 36B, the lamp has an enhanced attractive and novel appearance when it is lit.

In the embodiment, the entire rear surface of the panel 44A makes the light dispersion surface 44a; accordingly, the entire direct light-emitting region 36A can appear to be substantially evenly lit.

Next, a modification of the translucent member 36 will be described below.

Figure 6:
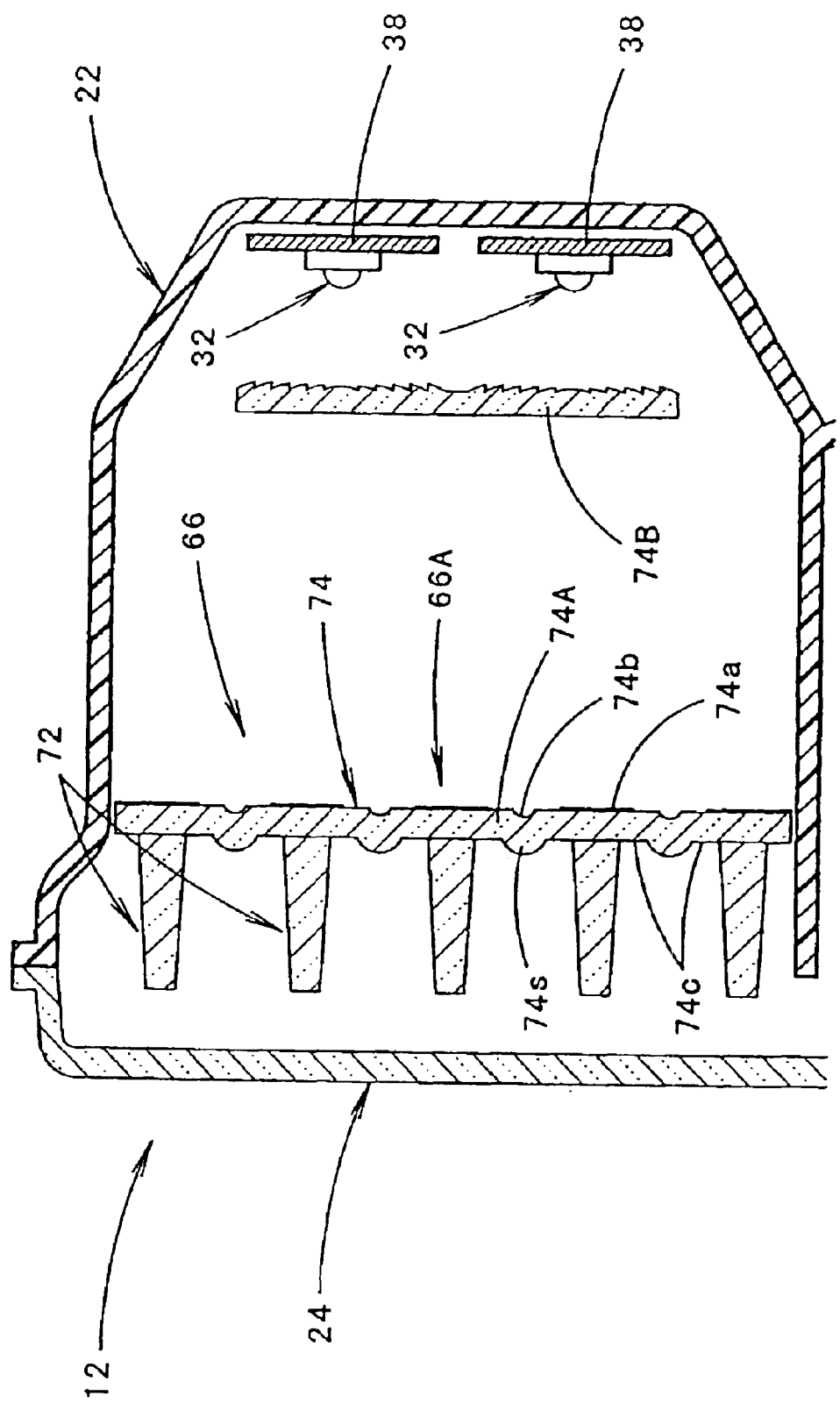
FIG. 6 is a sectional side view of the main portion of the translucent member used in the modification of the embodiment of the present invention.
Figure 7:
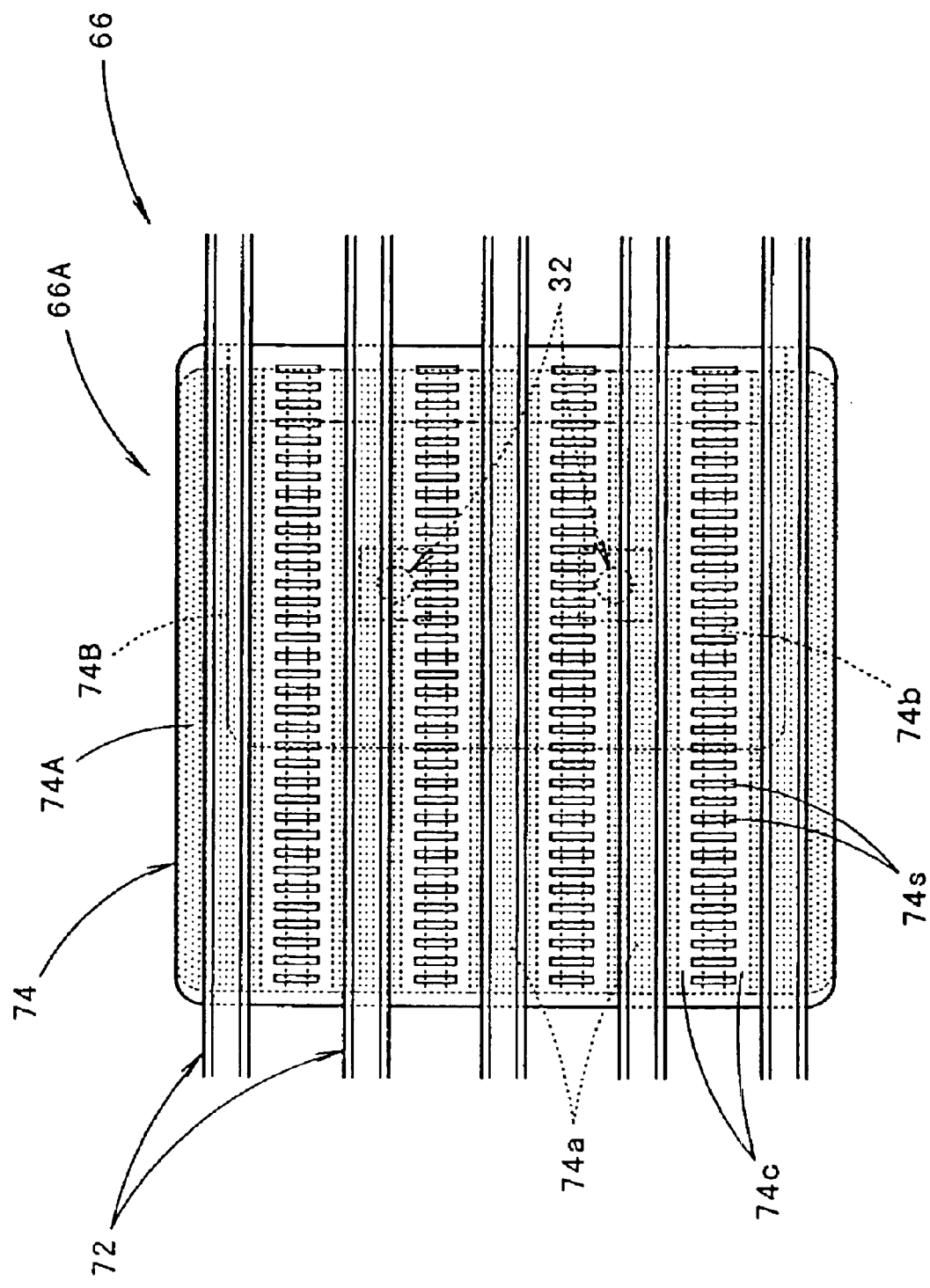
FIG. 7 is a front elevational view of the main portion of the translucent member used in the modification.

As seen from FIGS. 6 and 7 that shows the main portion of the translucent member 66, the translucent member 66 of the modification has a panel main body 74A in the panel 74 that has a different structure from the panel main body 44A of the above-described embodiment. The panel extended portion 74B of the panel 74 and the individual fins 72 are exactly the same as those of the panel extended portion 44B and the fins 42 of the above-described embodiment.

In the panel 74 of the modification, a plurality of lens elements 74s are formed at substantially equal intervals in a vertically central portion between the fins 72 on the front surface of the panel main body 74A. On the back surface of the panel main body 74A, cylindrical concave portions 74b each extending in the horizontal direction with a vertical width that is smaller than the vertical width of each lens element 74s are formed in the vertically mid portion between the fins 72. In addition, light diffusion treatment that uses embossing is performed behind each fin 72 on the rear surface of the panel main body 74A, thus forming a plurality of light diffusing surfaces 74a in a strip like manner extending in the horizontal direction. The vertical width of each light diffusing surface 74a is slightly larger than the vertical width of each fin 72. The horizontally long and strip-like regions with a small vertical width that are respectively located between the light diffusion surfaces 74a and the plurality of the lens elements 74s are formed as plain portions 74c.

In this modification, light which is incident to the panel main body 74A from two light-emitting diodes 32 through the panel extended portion 74B is diffusely transmitted through the light diffusion surfaces 74a and diffusely transmitted through the plurality of lens elements 74s in a different manner from when it is transmitted through the light diffusion surface 74a; and then such light is transmitted "as is" through the plain portions 74c. Thus, the appearance of the direct light-emitting region 66A can be changed in an abundance of manners, so that the lamp has an even more novel appearance when it is lit.

What is claimed is:

1. A vehicular marker lamp which is lit in red and is comprised of a lamp chamber constructed from a lamp body and a translucent cover attached to a front end opening of said lamp body, a plurality of light sources provided in said lamp chamber, and a translucent member that is provided in said light chamber and extends substantially along said translucent cover, wherein:

said plurality of light sources comprise a first light source disposed behind said translucent member and a second light source disposed in the vicinity of a side end portion of said translucent member, and said translucent member is comprised of:

a direct light-emitting region that transmits light, which is incident to said translucent member from said first light source, toward a front of said lamp, and an indirect light-emitting region that internally reflects light, which is incident to said translucent member from said second light source, so as to emit said light toward said front of said lamp, and one of said direct light-emitting region and said indirect light-emitting region is formed as a red transparent region and the other is formed as a colorless transparent region.

2. The vehicular marker lamp according to claim 1, wherein said light sources that emit light to said red transparent region are formed by light sources that emit red light.

3. The vehicular marker lamp according to claim 1, wherein said direct light-emitting region is set as a red transparent region, and a second translucent member which is red and transparent is provided between said direct light-emitting region and said first light source.

4. The vehicular marker lamp according to claim 1, wherein said translucent member is provided with a plurality of fins extending substantially in parallel with each other substantially along said translucent cover, said second light source is disposed for each one of said fins, and a plurality of reflective elements for emitting light, which is incident to said translucent member from said second light source, toward said front of said lamp are provided on a rear end surface of each one of said fins which is located in said indirect light-emitting region.

5. The vehicular marker lamp according to claim 1, wherein a light diffusion treatment is performed on at least a part of said direct light-emitting region for diffusely transmitting light from said first light source.

6. The vehicular marker lamp according to claim 2, wherein
said direct light-emitting region is set as a red transparent region, and
a second translucent member which is red and transparent is provided between said direct light-emitting region and said first light source.

7. The vehicular marker lamp according to claim 2, wherein
said translucent member is provided with a plurality of fins extending substantially in parallel with each other substantially along said translucent cover,
said second light source is disposed for each one of said fins, and
a plurality of reflective elements for emitting light, which is incident to said translucent member from said second light source, toward said front of said lamp are provided on a rear end surface of each one of said fins which is located in said indirect light-emitting region.

8. The vehicular marker lamp according to claim 2, wherein a light diffusion treatment is performed on at least a part of said direct light-emitting region for diffusely transmitting light from said first light source.

9. The vehicular marker lamp according to claim 3, wherein
said translucent member is provided with a plurality of fins extending substantially in parallel with each other substantially along said translucent cover,
said second light source is disposed for each one of said fins, and
a plurality of reflective elements for emitting light, which is incident to said translucent member from said second light source, toward said front of said lamp are provided on a rear end surface of each one of said fins which is located in said indirect light-emitting region.

10. The vehicular marker lamp according to claim 3, wherein a light diffusion treatment is performed on at least a part of said direct light-emitting region for diffusely transmitting light from said first light source.

11. The vehicular marker lamp according to claim 4, wherein a light diffusion treatment is performed on at least a part of said direct light-emitting region for diffusely transmitting light from said first light source.

12. The vehicular marker lamp according to claim 9, wherein a light diffusion treatment is performed on at least a part of said direct light-emitting region for diffusely transmitting light from said first light source.

* * * * *